Nov. 2, 1965  F. G. MULLER  3,215,400
BUTTERFLY VALVE ASSEMBLY AND SEAL FORMING MEANS THEREFOR
Filed Sept. 18, 1961  2 Sheets-Sheet 1

Frank G. Muller
INVENTOR.

BY Charles E. Lightfoot
ATTORNEY

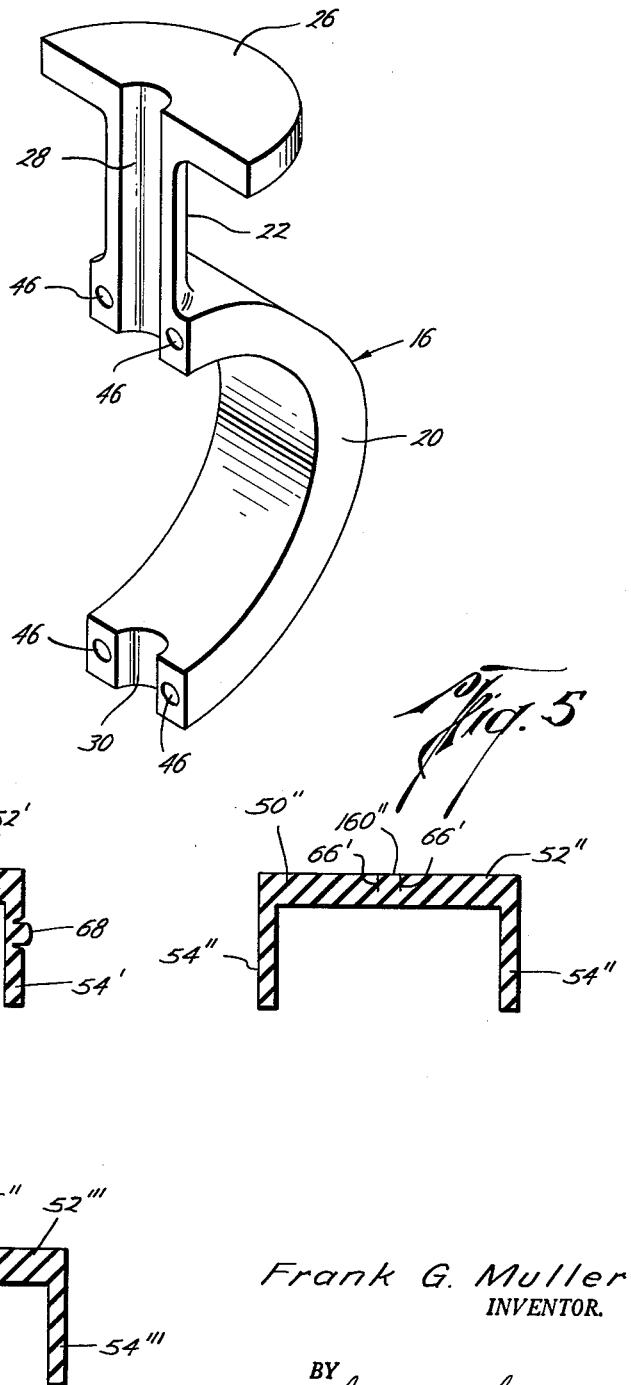

United States Patent Office 3,215,400
Patented Nov. 2, 1965

3,215,400
BUTTERFLY VALVE ASSEMBLY AND SEAL FORMING MEANS THEREFOR
Frank G. Muller, Box 967, La Porte, Tex.
Filed Sept. 18, 1961, Ser. No. 138,672
7 Claims. (Cl. 251—306)

This invention relates to valves of the butterfly or rotating disk type, and more particularly to a butterfly valve assembly in which the valve housing is formed in identical pieces adapted to be assembled about a flowway and having a seal forming element which functions to form a seal between the parts of the housing and also between the housing and valve.

The invention has for an important object the provision of a butterfly valve assembly having improved seal forming means and which is designed for high pressure use.

Another object of the invention is to provide a butterfly valve having a valve housing formed in parts of semi-circular shape adapted to be assembled about a flowway and a valve disk which is mounted on a rotatable shaft extending into the housing and also having a seal forming element formed in one piece and shaped to form a seal between the parts of the housing and between the housing and shaft in all positions of the valve.

A further object of the invention is the provision of a seal forming element for butterfly valves of the type having a valve housing formed in parts adapted to be assembled about a flowway and which element is shaped to form a seal between said parts and between the valve stem and housing in all positions of the valve and having a portion extending into the flowway in position for sealing engagement with the disk about the external periphery of the disk when the valve is closed.

Another object of the invention is to provide a butterfly valve of improved construction, which is of simple design and economical manufacture, and in which the parts are easily replaceable for purposes of maintenance and repair.

The above and other important objects and advantages of the invention will be apparent from the following detailed description constituting a specification of the same when considered in conjunction with the annexed drawings, wherein—

FIGURE 3 is a perspective view of one of the parts of the housing structure of the valve assembly of the invention;

FIGURE 4 is a cross-sectional view on a somewhat enlarged scale, illustrating a somewhat modified form of the seal forming element of the invention;

FIGURE 5 is a view similar to that of FIGURE 4, illustrating a further modification of the seal forming element of the invention; and FIGURE 6 is a view, similar to that of FIGURE 4, illustrating a still further modified form of the seal forming element.

Figure 1:
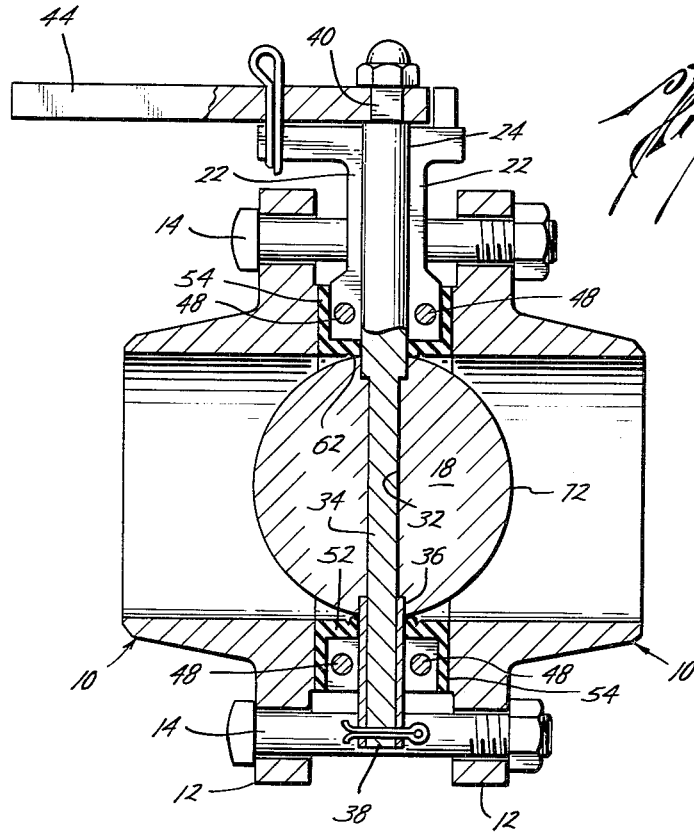
FIGURE 1 is a central, longitudinal, cross-sectional view of a preferred embodiment of the invention, showing the valve in open position.

Referring now to the drawings in greater detail, the valve assembly of the invention is designed for use in connection with flow lines having pipe fittings 10, 10, of the kind usually employed on the adjacent ends of sections of pipe of a pipe line into which the butterfly valve is to be connected, and each of which is provided with an external, annular, perforated flange 12, by which the fittings may be bolted together, as by means of bolts 14, with the valve assembly positioned between the flanges.

The valve assembly of the invention includes a valve housing or casing, made up of two identical parts, such as that generally designated 16 in FIGURE 3, which are of generally semi-circular shape, adapted to be assembled about the flowway of the flow line between the flanges 12, and within which a valve disk 18 is rotatably mounted for movement into and out of closing relation to the flowway.

Each of the housing parts 16 is formed with a semi-circular body portion 20 having oppositely facing flat faces positioned to be disposed in facing relation to the adjacent end faces of the flanges 12 when the valve is assembled, and also formed with a diametrically extending, external portion 22 shaped to form with the portion 22 of the other part a neck through which a valve stem 24 is rotatably extended diametrically into the interior of the housing. At its outer end, the neck portion 22 is formed with an external flange 26, positioned to form with the flange of the other housing part an external annular flange at the outer extremity of the neck of the housing. The neck portion 22 of each of the housing parts is formed with a groove 28 which forms with the groove of the other housing part a passageway through which the valve stem 24 is rotatably extended and each housing part has a groove 30 located diametrically opposite the groove 28 which is positioned to form with the groove 30 of the other housing part another passageway through which the valve stem 24 is rotatably extended. The valve disk 18 may be provided with a diametrical opening 32, through which the valve stem 24 is extended, the valve stem having a reduced portion 34 extending beyond the disk through the passageway provided by the grooves 34 of the housing, said reduced portion extending through a bushing 36, located in the passageway formed by the grooves 30. By thus forming the disk and valve stem, the disk may be readily placed on the stem and the bushing 36 thereafter placed over the reduced end of the stem and secured thereto by a suitable fastening such as the cotter pin 38 which extends through aligned openings in the bushing and stem. Moreover, by so constructing the valve and stem, the parts are easily assembled and disassembled for purposes of replacement or repair. The valve stem 24 also extends outwardly beyond the upper end of the neck portion of the housing, and may be provided with a squared portion 40 for the connection thereto of a handle 44, by which the stem may be rotated.

The valve housing parts 16 may also be provided with openings 46 on opposite sides of the grooves 28 and 30, through which suitable fastening means, such as bolts indicated at 48 in FIGURE 1 may be extended, to releasably secure the housing parts together in assembled relation about the flowway.

Figure 2:
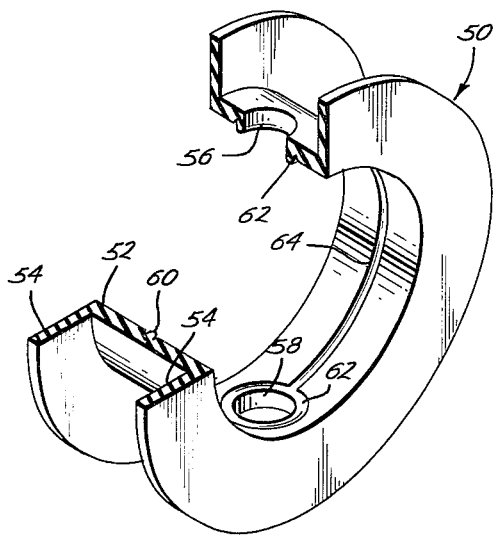
FIGURE 2 is a fragmentary, perspective view, partly broken away and partly in cross-section, illustrating the seal forming element of the invention.

The valve assembly of the invention includes a seal forming element, generally indicated at 50 in FIGURE 2, which is preferably of one piece, molded construction, formed of rubber or other suitable sealing material. The seal forming element is of annular configuration and of channel shape in cross-section, having a central web portion 52 and opposite, radially outwardly extending flanges 54. The seal forming element is shaped to receive between the flanges 54 the housing parts 16, with the opposite flat faces of the housing parts in contact with the inner surfaces of the flanges 54 and the inner semi-circular faces of the parts in contact with the outer face of the web 52, when the parts are assembled. When the parts are assembled, the inner face of the seal forming element will be positioned in surrounding relation to the flowway of the valve assembly.

The seal forming element is formed with diametrically opposite openings 56 and 58 in the web 52, through which the valve stem 24 and bushing 36 are extended when the valve is assembled, and in the preferred form of the seal forming element, as illustrated in FIGURES 1 and 2, the element has a continuous internal bead 60, formed with annular portions 62 surrounding the openings 56 and 58 and which are connected by peripherally extending portions 64 connecting said annular portions 62. The bead 60 projects inwardly radially, somewhat beyond the inner face of the web 52 into the flowway of the valve, the portions 62 of the bead being disposed for sealing engagement with the valve disk entirely about the valve stem in all positions of the disk and the portions 64 being disposed for sealing engagement with the periphery of the disk when the valve is closed. Thus, leakage from the flowway about the valve stem is prevented, and at the same time leakage through the flowway past the disk when the valve is closed will be effectively prevented.

In assembling the valve, constructed as described above, the disk 18 may be placed in the seal forming element and the valve stem inserted through the openings 56 and 58 of the element and through the diametrical opening of the disk, the bushing 36 being placed on the stem extending through the opening 58 and secured to the stem by the cotter pin 38. With the disk and stem thus assembled with the seal forming element, the housing parts 16 may then be assembled about the seal forming element in the external channel thereof between the flanges 54, with the valve stem extending through the passageways formed by the grooves 28 and 30, and the housing parts secured together by the bolts 48. The valve thus assembled is then positioned between the adjacent end faces of the flanges 12 of the fittings 10 with the outer faces of the flanges 54 of the sealing element in contact therewith and the flanges 12 secured together by the bolts 14. With the valve thus positioned in the flow line, the bolts 14 may be tightened to compress the seal forming element into seal forming engagement with the flanges 12 and the valve housing. It will be apparent that the seal forming element in this condition of the assembly will be effective to prevent leakage between the parts of the valve housing as well as preventing leakage between the housing and fittings and about the valve stem. Additionally, the seal forming element functions to prevent leakage of fluid through the flowway past the valve disk when the valve is closed.

A somewhat modified form of the seal forming element in illustrated in FIGURE 4, wherein the seal forming element 50' is formed with an internal bead 60' similar to the bead 60 but which is provided along each side thereof with slits 66 which are coextensive with the bead and which extend partially through the web 52', whereby the bead is rendered more flexible, and due to the greatly increased area of the bead which is thus exposed to the pressure of fluid in the flowway, such pressure tends to increase the sealing pressure of the bead on the outer peripheral surface of the valve disk when the valve is closed.

The seal forming element may also be formed with external beads 68 similar to the bead 60' extending about the flowway on the outer faces of the flanges 54' against which any pressure tending to leak past the element from the flowway between the flanges 12 and the valve housing will tend to increase the sealing contact between the element and the flanges 12.

A further modified form of the sealing element of the invention is illustrated in FIGURE 5. In this form of the element, the rib or bead 60 is omitted and in place thereof the element is formed with spaced apart, parallel slits 66' to provide an internal flexible portion 60" in the element positioned for engagement with the disk when the valve is closed to form a fluid tight seal between the disk and housing. The slits 66' serve the same purpose as the slits 66 in the form of the seal forming element illustrated in FIGURE 4, in that they provide an increased area on the portion 60" exposed to the pressure of fluid in the flowway, when the valve is closed, to cause an increase in the sealing pressure of the element against the disk to prevent leakage of fluid past the disk when the valve is used under high pressure conditions.

A still further modification of the seal forming element is illustrated in FIGURE 6. In this form of the element the sealing bead or rib 60''' is of generally dove-tailed shape in cross-section, to provide external side surfaces 66" and a widened inner face 70. It will be apparent that by this construction, the inner face 70 of the rib 60''' will be in sealing contact with the periphery of the valve disk when the valve is closed, and any increase in the pressure of fluid in the flowway will be effective against one of the side surfaces 66" to increase the sealing pressure of the rib against the valve disk to effectively prevent leakage past the disk. In other respects, this form of the seal forming element is substantially the same and functions in the same manner as the form illustrated in FIGURE 2.

The valve disk 18 is preferably formed with a spherical, seal-engaging face 72, so that the external periphery of the disk will always be in sealing contact with the seal forming element about the valve stem 24 in all positions of the disk, and it will be apparent that with the disk so shaped, the area of contact between the disk and seal forming element will be gradually increased as the valve is rotated to closed position, without causing distortion, pinching, cutting or other damage to the packing or sealing element.

It will thus be seen that the invention, constructed as described above, provides a butterfly valve assembly in which the parts are easily assembled and disassembled which may be quickly and easily inserted into or removed from a flow line, and in which means is provided for effectively sealing the valve against leakage throughout a wide pressure range.

The invention is disclosed herein in connection with a certain specific arrangement of the parts and certain preferred forms of the seal forming element, but it will be understood that these are intended by way of example only, and that numerous changes can be made in the construction and arrangement of the parts, within the spirit of the invention and the scope of the appended claims.

Having thus clearly shown and described the invention, what is claimed as new and desired to secure by Letters Patent is:

1. In a seal the combination with two parts having flat surface portions disposed in spaced apart, overlapping relation, of a seal forming element formed of resilient material adapted to be positioned between the parts and having flat faces positioned for contact with said portions and a continuous bead projecting beyond each of said faces, said element also having slits extending inwardly from said faces coextensive with the side walls of the beads to increase the area of said side walls.

2. A butterfly valve assembly comprising a housing formed with a flowway therethrough, a valve disk rotatably mounted in the housing for movement into and out of a position in a plane transverse to the flowway, and seal forming means formed of resilient material comprising a tubular element in the housing having an inner surface in and surrounding the flowway and an internal rib extending about the flowway and projecting radially inwardly beyond said surface in position for sealing engagement with the disk to close the flowway when the disk is in said plane, said element also having an internal peripheral slit on each side of and forming a radially outwardly extending continuation of the side wall of said rib.

3. For use in a butterfly valve having a housing formed with a flowway therethrough, and a valve disk rotatably mounted in the housing for movement into and out of a position in a plane transverse to the flowway, a seal forming element formed of resilient material comprising a tubular element having an inner surface, an internal sealing rib extending about the inner surface and projecting radially inwardly beyond said inner surface, and internal peripheral slits extending radially outwardly from said surface along each side of said rib, said slits each having one wall which is coextensive with the adjacent side wall of said rib.

4. The seal forming element of claim 3 wherein said tubular element has a circular opening through the wall thereof, an internal sealing rib surrounding said opening and projecting radially inwardly beyond said inner surface, one wall of said latter rib being a radially inward extension of the wall of said tubular element surrounding said opening, and an internal peripheral slit on the other side of said latter rib having one wall coextensive with the adjacent side of said latter rib.

5. A butterfly valve assembly comprising a tubular housing formed with a flowway and shaped to be assembled in end-to-end engagement between the adjacent ends of two sections of pipe to form therewith a flow line, a valve disk rotatably mounted in the housing for movement into and out of position in a plane transverse to the flowway, and seal forming means formed of resilient material including a tubular element having a tubular web body portion in said housing, said body portion having an inner surface in and surrounding the flowway and an internal rib extending about the flowway and projecting radially inwardly beyond said surface in position for sealing engagement with said disk to close the flowway when the disk is in said plane, annular flange portions at each end of said body portion extending radially outwardly and disposed between and in sealing contact with said housing and said pipe ends, each flange having a flat outer face facing one of said pipe ends for contact in sealing relationship therewith and a continuous sealing rib projecting outwardly beyond said outer face of the flange, said tubular body portion having internal peripheral slits extending radially outwardly from said surface alongside of said internal rib, and slits in each flange extending inwardly from the outer face thereof and coextensive with the side walls of the continuous ribs to increase the areas of said side walls.

6. For use in a butterfly valve formed with a flowway therethrough and shaped to be positioned between the adjacent ends of two sections of pipe to form therewith a flow line, and a valve disk rotatably mounted in the housing for movement into and out of a position extending transversely of the flowway, a seal forming means formed of resilient material comprising a tubular element having a tubular web body portion with opposed open ends, said body portion having an inner surface, an internal sealing rib about and projecting radially inwardly beyond said inner surface, and internal peripheral slits on each side of said internal rib each forming a radially outwardly extending continuation of the side walls of said internal rib, annular flange portions adjacent each end of said body portion extending radially outwardly therefrom, each flange having a flat outer face facing in a direction axially away from said body portion, a continuous sealing rib projecting outwardly beyond said outer face, and slits in each flange extending inwardly from the outer face and coextensive with the side walls of the continuous sealing ribs to increase the area of said side walls.

7. A butterfly valve assembly comprising a housing formed with a flowway therethrough and shaped to be positioned between the adjacent ends of two sections of pipe to form therewith a flow line, seal forming means formed of resilient material including a tubular element having a web portion extending through the housing in surrounding relation to the flowway and annular flanges extending radially outwardly from said web between and in sealing contact with said housing and said pipe ends, each flange having a flat outer face facing one of said pipe ends for contact in sealing relationship therewith, a continuous sealing rib projecting outwardly beyond said outer face of each flange and slits in each flange extending inwardly from the outer face of the flange along each side of said rib, said slits having one wall which is coextensive with the adjacent side wall of said rib.

References Cited by the Examiner

UNITED STATES PATENTS

| | | | |
|---|---|---|---|
| 2,383,570 | 8/45 | Sellew | 277—211 XR |
| 2,396,491 | 3/46 | Chamberlain | 277—209 |
| 2,729,478 | 1/56 | Chambers | 277—206 |
| 2,884,224 | 4/59 | Fawkes | 251—306 |
| 2,923,524 | 2/60 | Fawkes | 251—306 |
| 2,987,072 | 1/61 | Muller | 251—306 |
| 3,024,802 | 3/62 | Stillwagon | 137—454.2 XR |
| 3,048,363 | 8/62 | Garrigan | 251—307 |
| 3,105,672 | 10/63 | Kinney | 251—306 |
| 3,107,922 | 10/63 | Nathan | 277—211 XR |
| 3,118,465 | 1/64 | Scaramucci | 137—454.2 |

FOREIGN PATENTS 670,327  1/39  Germany.

ISADOR WEIL, *Primary Examiner.*